J. A. DE BOUZEK.
PHOTOGRAPHIC CAMERA.
APPLICATION FILED MAR. 27, 1909.
1,130,576.
Patented Mar. 2, 1915.
3 SHEETS—SHEET 2.
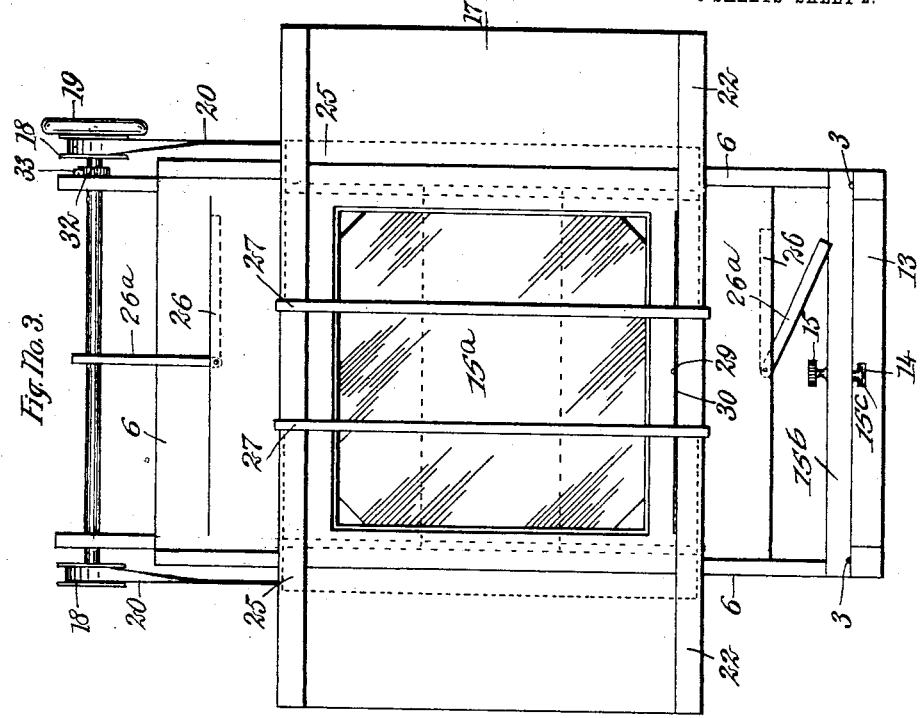
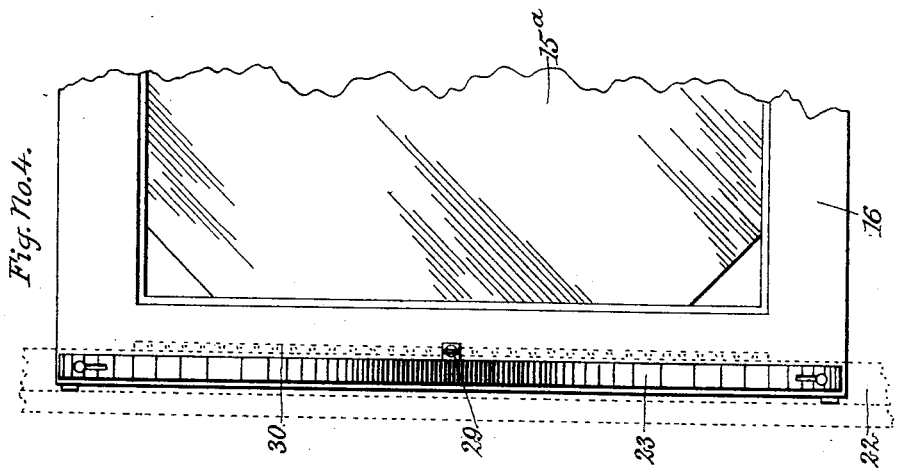
Witnesses
Inventor
Jean A. De Bouzek
By
Attorneys J. A. DE BOUZEK.
PHOTOGRAPHIC CAMERA.
APPLICATION FILED MAR. 27, 1909.
1,130,576.
Patented Mar. 2, 1915.
3 SHEETS—SHEET 3.
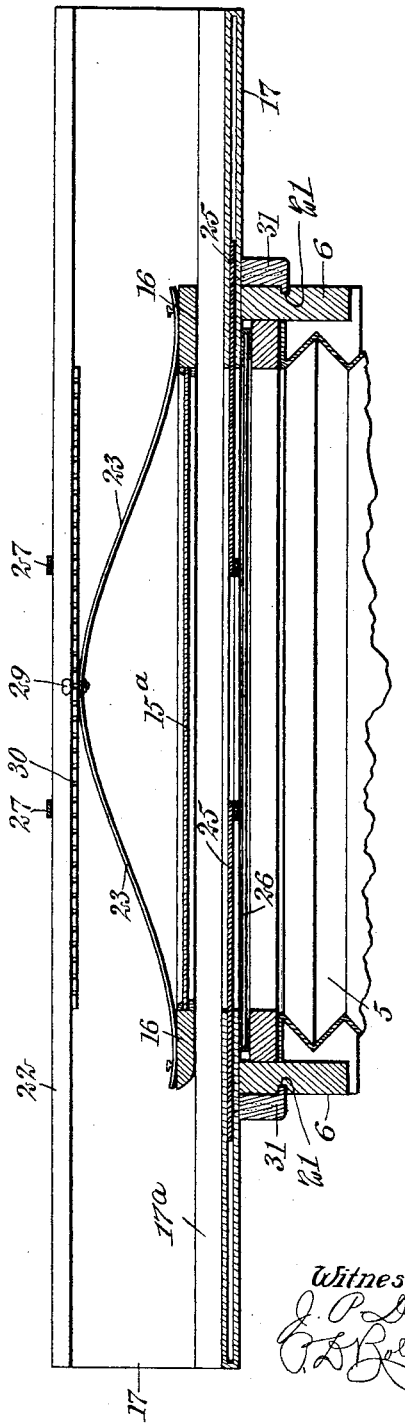
Fig. No. 5.
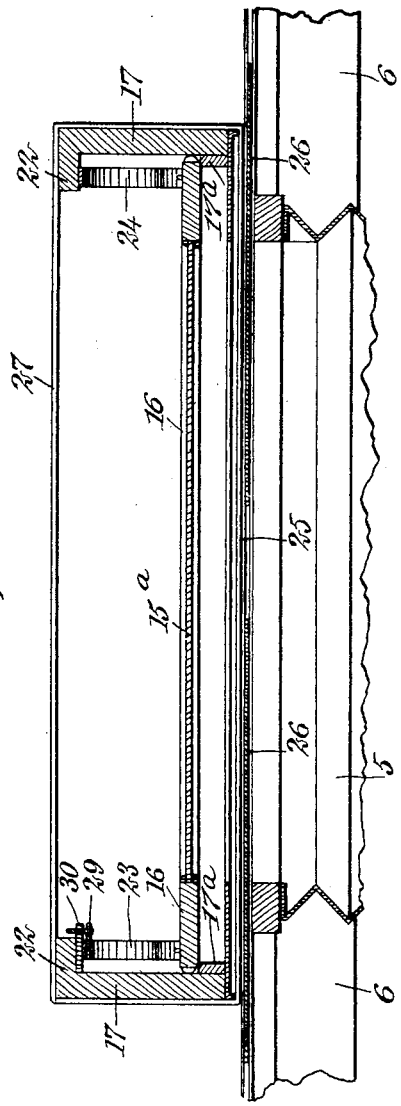
Fig. No. 6.
Witnesses
J. P. Davis
Inventor
Jean A. De Bouzek
By
Attorneys

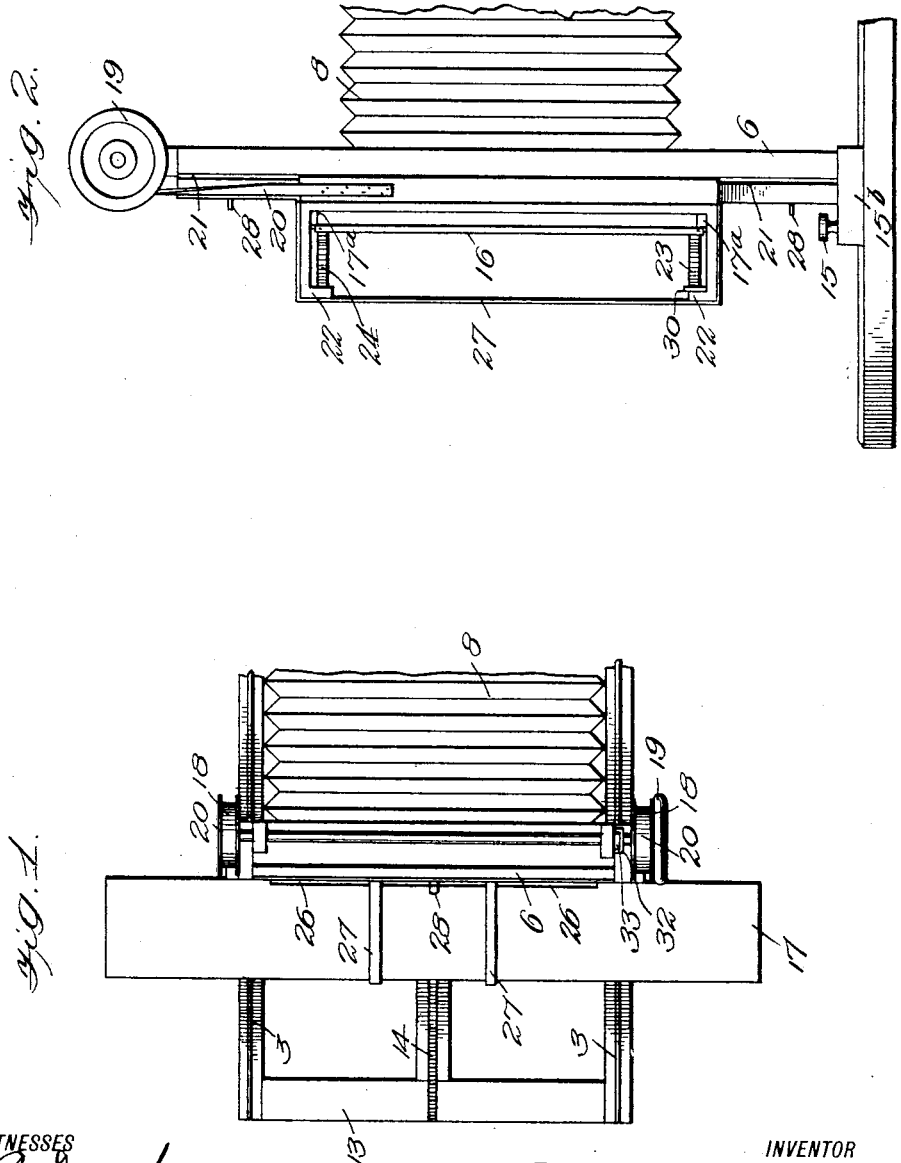

UNITED STATES PATENT OFFICE.

JEAN A. DE BOUZEK, OF SALT LAKE CITY, UTAH.

PHOTOGRAPHIC CAMERA.

1,130,576.     Specification of Letters Patent.     Patented Mar. 2, 1915.

Application filed March 27, 1909. Serial No. 486,108.

*To all whom it may concern:*

Be it known that I, JEAN A. DE BOUZEK, a citizen of the United States, and resident of Salt Lake City, county of Salt Lake, and State of Utah, have invented a certain new and useful Photographic Camera, of which the following is a description.

Among the principal objects which the present invention has in view are: to provide a camera adapted to receive a plurality of exposures on a single sensitized plate, in predetermined locations; and to provide means for adjusting said plate with reference to the arrangement designed for the photographs; to provide means for adjusting the ground glass to any position in a camera and to bring the image quickly to any location without moving the subject or the camera.

In the drawings:—Figure 1 is a plan view of a portion of a photographic camera constructed in accordance with this invention. Fig. 2 is a side elevation of the same. Fig. 3 is a rear elevation of the same. Fig. 4 is a detail view in elevation, of a segment of the ground glass frame and retaining devices; the dotted lines indicate the elevator frame in which the ground glass frame is carried. Fig. 5 is an enlarged detail view in horizontal section of the rear end of the camera, showing the elevator, ground glass frame, and exposure slides. Fig. 6 is an enlarged detail view in vertical section of the rear end of the camera, showing the elevator, ground glass frame, and exposure slides.

Referring to the drawing 5 is the bellows which is attached to the frame 6. The frame —6— is constructed to move back and forth on the bed —13—, the tracks —3— and rack bar —14— being provided therefor. The frame —6— is held by means of the milled nut —15— in any position. The nut 15 is rotatively mounted in a foot-bar 15$^b$, and is provided with a suitable gear wheel 15$^c$, the teeth whereof are in mesh with the rack 14. The construction is common to cameras, and is such that, when the nut 15 is revolved, the frame 6 and parts connected therewith are moved lengthwise the bed 13.

The ground glass —15$^a$— is mounted in the frame —16— with the ground surface outward or rearward. Upon this ground surface is drawn in diagram the spaces which it is desired to fill by the photographs to be taken on the sensitized plate. This plate is of a size sufficient to hold photographs of the size and arrangement as per the diagram drawn on the ground glass.

As above stated, it is the purpose of the invention to produce a series of photographs upon the same sensitized plate by successive exposures. It is intended that this plate shall be used in photo-engraving to permit several half-tone or line exposures to be taken from the same setting.

The ground glass —15$^a$— is mounted in an elevator frame —17. This elevator is mounted on runners —31— which are slidably inserted in grooves —21— in the frame —6—. The elevator is adapted to be raised by means of drums 18 one of which is provided with a hand wheel —19— and flexible hoists —20—. These hoists may consist of the leather straps shown in the drawings, or may consist of flexible wire cables. By means of the hoisting devices the elevator is raised and lowered in the grooves —21—. The elevator is provided with the over-hanging extensions —22—22— which provide runways or guide slots extending horizontally through the elevator. The elevator is maintained in its raised position by a ratchet wheel —32— and pawl —33—.

The frame —16— for the ground glass rests against the strips 17$^a$ and is provided with bent leaf springs —23— and —24—, which are adapted to rest against the inner surface of the extensions —22—22— to exert a pressure upon the frame —16— to hold it against the frame —6—. As in ordinary cameras, the ground glass is normally in proper position for focus, whereby when the ground glass is retracted and the sensitized plate substituted in the same position, the said sensitized plate is in the exact position of proper focus.

The elevator —17— is provided with the obscuration slides —25—25— and the frame 6 with slides —26—26—. The slides —25—25— operate horizontally and the slides —26—26— operate vertically. Each member of a pair approaches the other edge to edge, so that when moved to their full limit toward each other they abut. They are so disposed as to extend directly over the face of the sensitized plate and of the ground glass when in position, to obtrude themselves in the path of the light entering from the lens —4—. The slides 26, 26 are shifted vertically by means of pivoted handles 26ª, 26ª. These handles fold into recesses, as shown best in Fig. 3 of the drawings, in which position they are removed from interference with any of the surrounding structure. These slides can be separated without removing either the ground glass or the sensitized plate, and for this purpose the slides —25—25— are provided with the adjustment rods —27—27—, and the slides —26—26— are provided with pivoted handles 26ª, 26ª. By the proper manipulation of these two pairs of slides, it will be observed that within an area of any given radius there can be produced a diminished square opening in any portion of the said area.

With a camera having the elevator, ground glass, and adjustable slides, as above described, the operation would be as follows: The ground glass 15ª can be provided with marked spacings, as desired, or the subject can be focused to the desired size, and the slides 25, 25 and 26, 26 are adjusted to conform with the spaces. As indicated, these slides may be so adjusted that the size and shape of the opening for the passage of the light received from the lens may be varied to suit the spaced diagram or subject, as indicated on the ground glass. The ground glass frame 16 is locked to the elevator 17 by means of a lock 29 which engages the rack 30 mounted on the extension 22 of the elevator. The sensitized plate with the plate holder is now inserted by retracting the ground glass frame against the springs 23 and 24, and the plate holder is registered with the ground glass frame, the ground glass frame and the plate holder being placed in relation to each other and in relation to the elevator 17. For duplicating the same exposure, the slides are left in this position and the ground glass frame is unlocked from the elevator, moved sidewise until the desired space on said glass is inclosed on both sides by the rods 27, which are seen on the outside of the camera. The sensitized plate is covered and withdrawn. It is developed as a single plate, when it will be found that the various exposures have produced clean and clear negatives, each separated from the other by a space which may be worked down to the eighth of an inch. The slides —25—25— and —26—26— are so constructed as to operate so closely to the sensitized surface of the plate as to prevent light leakage around the edges of the slides.

While I have herein described the operation of exposing the plate as continuous, I may proceed by removing the sensitized plate after each exposure, and resetting the focusing glass for the succeeding exposure.

Having thus described this invention, what is claimed is:—

1. A photographic camera having a focusing plate, a locking pin mounted on said plate; an elevator frame for said plate, said frame having transverse length necessary to support said plate when moved to either side of the vertical median plane of the camera a distance sufficient for the exposure of the edges of said plate adjacent both vertical edges thereof; a rack on said elevator frame to be engaged by said locking pin on said plate; a plurality of light exclusion slides mounted on said elevator frame and main frame for interposition between said plate and said camera; a vertically disposed guide frame to support said elevator frame; and manually operative means for lifting said elevator frame on said guide frame.

2. In a photographic camera of the character described, a main frame, a focusing plate; an elevator frame for said plate, having transverse length necessary to permit lateral shift of said holder for exposure of the section of the plate adjacent both vertical edges thereof; light exclusion slides mounted on said elevator frame and main frame; and manually operative horizontally and vertically to vary the dimension of the opening provided in said elevator frame for the passage of light from said camera to said plate and spacing rods visibly carried by said slides for showing on the back of the said plate the size of the light opening formed by the adjustment of said slides.

3. In a photographic camera, a horizontally adjustable frame, an elevator mounted on the said frame, means for raising and lowering the elevator frame, a focusing plate carried by the elevator frame, horizontally movable slides carried by the elevator frame, and vertically movable slides carried by the adjustable frame.

In testimony whereof I have signed my name to this specification in the presence of two subscribing witnesses.

JEAN A. DE BOUZEK.

Witnesses:
ESTHER O. JOHNSON,
MARGARET COSGROVE.